US008416297B2

(12) United States Patent
Finn et al.

(10) Patent No.: US 8,416,297 B2
(45) Date of Patent: Apr. 9, 2013

(54) SYSTEM AND METHOD FOR VIDEO DETECTION OF SMOKE AND FLAME

(75) Inventors: Alan Matthew Finn, Hebron, CT (US); Pei-Yuan Peng, Ellington, CT (US); Ziyou Xiong, Wethersfield, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 0 days.

(21) Appl. No.: 12/448,950

(22) PCT Filed: Jan. 16, 2007

(86) PCT No.: PCT/US2007/001009
§ 371 (c)(1),
(2), (4) Date: Jul. 16, 2009

(87) PCT Pub. No.: WO2008/088324
PCT Pub. Date: Jul. 24, 2008

(65) Prior Publication Data
US 2010/0073477 A1    Mar. 25, 2010

(51) Int. Cl.
*H04N 7/18* (2006.01)
*G06K 9/00* (2006.01)
*G08B 23/00* (2006.01)

(52) U.S. Cl. .................... 348/143; 340/577

(58) Field of Classification Search .......... 348/143; 382/100; 340/577; *H04N 7/18*
See application file for complete search history.

(56) References Cited

U.S. PATENT DOCUMENTS

| 6,963,662 B1 | 11/2005 | Leclerc et al. |
| 2002/0114525 A1 | 8/2002 | Bolle et al. |
| 2003/0044042 A1* | 3/2003 | King et al. ............... 382/100 |
| 2003/0095140 A1 | 5/2003 | Keaton et al. |
| 2003/0141980 A1 | 7/2003 | Moore et al. |
| 2003/0190076 A1 | 10/2003 | Delean |

OTHER PUBLICATIONS

Chen et al., An Automatic Fire Searching and Suppression System for Large Spaces, Fire Safety Journal 39 (2004), pp. 297-307.
Healey, et al., "A System for Real-Time Fire Detection," IEEE Conf. Computer Vision and Pattern Recognition. (1993), pp. 605-606.
Morris et al., "Recent Developments in Subterranean Robotics," Report from Field Robotics Center, Carnegie Mellon University, Pittsburgh, Pennsylvania 15213, Retrieved on Sep. 5, 2007 from http://www.cs.cmu.edu/~dbradley/publications/morris-jfr-06.pdf>.
Phillips et al., "Flame Recognition in Video," Fifth IEEE Workshop on Applications of Computer Vision, Dec. 2000, pp. 224-229.

(Continued)

*Primary Examiner* — Y Lee
*Assistant Examiner* — Yulin Sun
(74) *Attorney, Agent, or Firm* — MH2 Technology Law Group, LLP

(57) ABSTRACT

A method for detecting flame and smoke using spatial analysis of video input (40) provided by a video detector. The video input (40) consists of a number of individual frames, wherein analysis is performed on each individual frame to detect and outline regions that may contain smoke or flame (42). Based on the defined outline or boundary of each detected region, spatial features associated with the region are extracted (52), such as perimeter/area and surface area/volume. The extracted spatial features are related to one another (54) to determine the likelihood that the region contains smoke or flame. Extracted spatial features may be related to one another using a power law relationship that provides an indication of the turbulence associated with a bounded region, wherein turbulence is a characteristic of both flame and smoke.

19 Claims, 3 Drawing Sheets

OTHER PUBLICATIONS

Toreyin et al., "Wavelet Based Real-Time Smoke Detection in Video," EUSPICO 2005, Antalya, Turkey.

International Search Report from the Patent Cooperation Treaty in counterpart foreign application PCT/US2007/001009 filed Jan. 16, 2007.

Supplementary European Search Report dated Jan. 25, 2012; EP Application No. 07716621.3; 7 pages.

Phillips et al., "Flame Recognition in Video", Fifth IEEE Workshop on Applications of Computer Vision, pp. 224-229, Dec. 2000 http://vision.eecs.ucf.edu/projects/Fire/Fire.pdf, accessed Sep. 13, 2012, 12 pages.

Toreyin et al., "Flame Detection in Video Using Hidden Markov Models", ICIP, 2005, Genova, Italy http://www.cs.bilkentedu.tr/~ismaila/MUSCLE/HMMIcip05.pdf, accessed Sep. 13, 2012, 4 pages.

Toreyin et al., "Wavelet Based Real-Time Smoke Detection in Video", EUSIPCO 2005, Antalya, Turkey http://www.cs.bilkent.edu.tr/~yigithan/publications/eusipco2005.pdf, accessed Sep. 13, 2012, 4 pages.

Xu et al., "Snakes, Shapes, and Gradient Vector Flow", IEEE Transactions on Image Processing, vol. 7, No. 3, Mar. 1998, pp. 359-369 http://ww.vavlab.ee.boun.edu.tr/courses/574/materialx/Active%20Contours/xu_GVF.pdf, accessed Sep. 13, 2012, 11 pages.

\* cited by examiner

SYSTEM AND METHOD FOR VIDEO DETECTION OF SMOKE AND FLAME

BACKGROUND OF THE INVENTION

The present invention relates generally to computer vision and pattern recognition, and in particular to video analysis for detecting the presence of smoke or flame as indicative of a fire.

The ability to detect the presence of flame or smoke is important on a number of levels, including with respect to human safety and the safety of property. In particular, because of the rapid expansion rate of a fire, it is important to detect the presence of a fire as early as possible. Traditional means of detecting fire include particle sampling (i.e., smoke detectors) and temperature sensors. While accurate, these methods include a number of drawbacks. For instance, traditional particle or smoke detectors require smoke to physically reach a sensor. In some applications, the location of the fire or the presence of ventilated air systems prevents smoke from reaching the detector for an extended length of time, allowing the fire time to spread. A typical temperature sensor requires the sensor to be located physically close to the fire, because the temperature sensor will not sense a fire until it has spread to the location of the temperature sensor. In addition, neither of these systems provides as much data as might be desired regarding size, location, or intensity of the fire.

Video detection of a fire provides solutions to some of these problems. A number of video content analysis algorithms for detecting fire are known in the prior art. However, the typical video content analysis algorithms known in prior art are not effective at quickly recognizing smoke or fire. For instance, some video content analysis algorithms are only capable of either detecting flame or smoke, but not both. In other video content analysis algorithms, the presence of fire or smoke is incorrectly detected, resulting in false alarms.

Therefore, it would be beneficial to develop an improved method of analyzing video data to detect the presence of smoke and flame.

BRIEF SUMMARY OF THE INVENTION

Described herein is a method for detecting the presence of flame or smoke based on a video input. The video input is analyzed to identify regions that indicate the presence of flame or smoke. Spatial analysis is performed on the identified regions, wherein the spatial analysis extracts spatial features associated with the identified region. Analysis of the extracted spatial features is used to determine whether the identified region does indeed contain smoke or flame.

In another aspect, a video recognition system detects the presence of flame or smoke based on video input provided by a means for acquiring video data. The acquired video data is provided to a means for storing video data. Individual frames stored in the means for storing video data are provided to a means for detecting a boundary of a region identified as potentially containing smoke or flame. Following identification of the boundary of the identified region, spatial values associated with the identified region are measured by a means for measuring spatial values. Means for determining the presence of smoke or flame is based, at least in part, on the measured spatial values.

In another aspect of the present invention, a system for detecting the presence of flame or smoke is described. The system includes at least one video detector for capturing video input and a video recognition system. Video input captured by the video detector is provided to the video recognition system. The video recognition system defines boundaries around regions identified as potentially containing smoke or flame and measures spatial values associated with each identified region based on the defined boundaries. The video recognition system determines whether flame or smoke is present in the identified region based, at least in part, on the measured spatial values.

DETAILED DESCRIPTION

A method for determining the presence of smoke or flame in a video frame or sequence of video frames seeks to detect the presence of flame or smoke by first identifying regions as potentially or likely containing smoke or flame. The spatial or geometric attributes of the identified regions are analyzed to determine whether the identified region does in fact contain smoke or flame. In particular, the method uses the extracted spatial attributes to determine if an identified region displays the turbulent behavior that is characteristic of both flame and smoke. Turbulence is calculated by relating, in one embodiment, the perimeter of a region to the area of the same region. In another embodiment, turbulence is calculated by relating the surface area of a region to the volume of the same region. Based on the calculated turbulence, the presence of flame or smoke can be detected. Therefore, by analyzing the spatial features of a region identified as potentially containing smoke or flame, an accurate determination can be made regarding whether the identified region actually contains smoke or flame.

Furthermore, the method takes advantage of the quasi-fractal nature of smoke and flame, which means that regardless of scale, smoke and flame display self-similarity characteristics. Because of the quasi-fractal nature of fire, spatial features extracted with respect to an identified region may be related by a power law relationship that provides a measure of the turbulence associated with an identified region, even if the identified region is very small.

Figure 1:
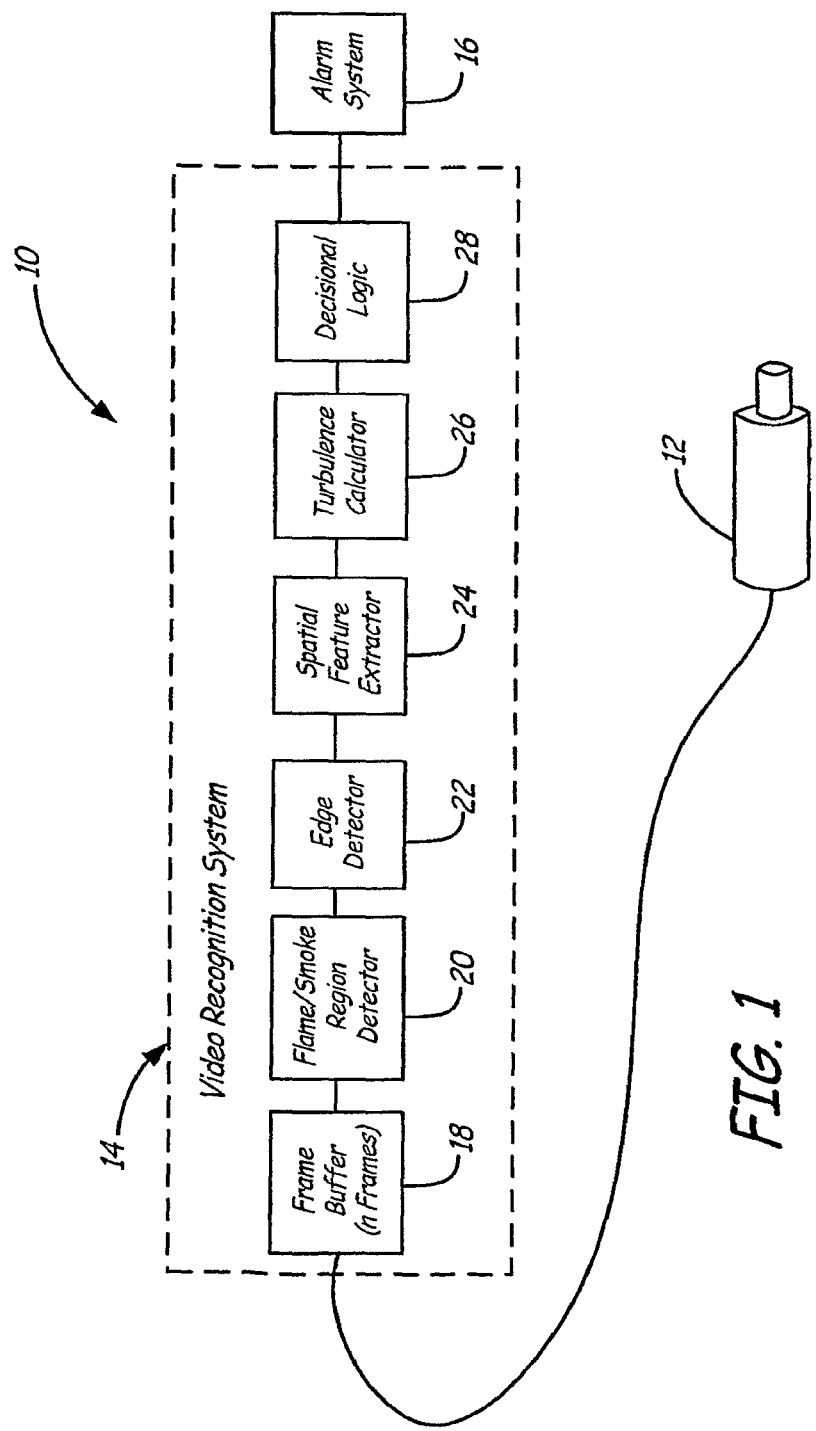
FIG. 1 is a functional block diagram of a video detector and video recognition system.

FIG. 1 is a functional block diagram of an embodiment of fire detection system 10, which includes, but it is not limited to, at least one video detector 12, video recognition system 14, and alarm system 16. Video detector 12 captures a number of successive video images or frames, and provides these images to video recognition system 14. In one embodiment, video detector 12 is implemented with a video camera. The term "video" used herein is not restricted to only video in the human perceptible spectrum, but may include sequences of images outside the human perceptible spectrum such as in the infrared or ultraviolet. In addition, the capture of video may be performed by any one of a number of devices including, but not limited to, digital video devices, analog video devices, infrared detection devices, or still image capture devices. The provision of video by video detector 12 to video processing system 14 may be by any of a number of means, e.g., by a hardwired connection, over a dedicated wireless network, over a shared wireless network, etc. Video recognition system 14 employs, but is not limited to, the following elements to determine whether flame or smoke are present: frame buffer 18, flame/smoke region detector 20, edge detector 22, spatial feature extractor 24, turbulence calculator 26 and decisional logic 28. A combination of hardware and software may be used to implement each of the elements within video recognition system 14. Hardware included within video processing system 14 may include a video processor as well as memory. Software included within video recognition system 14 may include video content analysis software.

Video input from video detector 12 is provided to frame buffer 18, which temporarily stores a number of individual frames. Frame buffer 18 may retain one frame, every successive frame, or may only store a certain number of successive frames for periodic analysis. Frame buffer 18 may be implemented by any of a number of means including separate hardware or as a designated part of computer memory. Frame buffer 18 provides stored images to flame/smoke region detector 20, which identifies and detects those regions within each frame that may potentially indicate the presence of smoke or flame. Initial flame/smoke region detector 20 may use a number of well-known methods to identify regions as potentially including the presence of flame or smoke. For instance, smoke and flame may be detected using object obscuration analysis, color comparison models, flickering effect analysis, blurring analysis, and shape analysis.

In particular, color comparison algorithms are often useful in detecting the presence of fire. Color comparison algorithms operate in either RGB (red, green, blue) color space or HSV (hue, saturation, value) color space, wherein each pixel can be represented by a RGB triple or HSV triple. Distributions representing flame or smoke images and non-fire images are generated by classifying each pixel in an image based on an RGB or HSV triple value. For example, the distribution may be built using a non-parametric approach that utilizes histogram bins to build a distribution. Pixels from a flame or smoke image are classified (based on an RGB or HSV triple value) and projected into corresponding discrete bins to build a distribution representing the presence of flame or smoke. Pixels from non-fire images are similarly classified and projected into discrete bins to build a distribution representing a non-fire image. Pixels in a current video frame are classified (based on RGB and HSV values) and compared to the distributions representing flame or smoke images and non-fire images to determine whether the current pixel should be classified as a flame or smoke pixel or a non-fire pixel.

In another embodiment, distributions are generated using a parametric approach that includes fitting a pre-computed mixture of Gaussian distributions. Pixels from both fire images and non-fire images are classified (based on RGB or HSV triples) and positioned in three-dimensional space to form pixel clusters. A mixture of gaussian (MOG) distribution is learned from the pixel clusters. To determine whether an unknown pixel should be classified as a fire pixel or non-fire pixel, the corresponding value associated with the unknown pixel is compared with the MOG distributions representing fire and non-fire images.

The use of a color comparison algorithm is described in further detail by the following reference: Healey, G., Slater, D., Lin, T., Drda, B., Goedeke, A. D., 1993 "A System for Real-Time Fire Detection." *IEEE Conf. Computer Vision and Pattern Recognition* (1993): 605-606. Other well known methods are described in Phillips, W., Shah, M., and da Vitoria Lobo, N., "Flame Recognition in Video", Fifth IEEE Workshop on Applications of Computer Vision, p. 224-229, December, 2000; Toreyin, BU., Dedeoglu, Y., Cetin, A E., "Flame Detection In Video Using Hidden Markov Models" ICIP 2005, Genova, Italy; and Toreyin, B U., Dedeoglu, Y., Cetin, A E., "Wavelet Based Real-Time Smoke Detection In Video", EUSIPCO 2005, Antalya, Turkey.

A metric associated with the characteristic flickering effect of fire may also be calculated to identify whether a region potentially contains fire. Because of the turbulent motion characteristic of fires, individual pixels in a block containing fire will display a characteristic known as flicker. Flicker can be defined as the changing of color or intensity of a pixel from frame to frame. Thus, the color or intensity of a pixel from a first frame is compared with the color or intensity of a pixel (taken at the same pixel location) from previous frames. A flicker metric is generated based on the number of pixels containing the characteristic of flicker, or a percentage of pixels containing characteristics of flicker. Further information regarding calculation of flicker effects to determine the presence of fire is provided in the following references: W. Phillips, III, M. Shah, and N. da Vitoria Lobo. "Flame Recognition in Video", In Fifth IEEE Workshop on Applications of Computer Vision, pages 224-229, December 2000 and T.-H. Chen, P.-H Wu, Y.-C. Chiou, "An early-detection method based on image processing", in Proceedings of the 2004 International Conference on Image Processing (ICIP 2004), Singapore, Oct. 24-27, 2004, pp. 1707-1710.

Other video metrics indicative of fire, such as a shape metric, partial or full obscuration metric, or blurring metric, as are well known in the art, may also be computed without departing from the spirit and scope of this invention. Each of these metrics is calculated by comparing a current frame or video image with a reference image, where the reference image might be a previous frame or the computed result of multiple previous frames. For instance, the shape metric includes first comparing the current image with a reference image and detecting regions of differences. The detected regions indicating a difference between the reference image and current image are analyzed to determine whether the detected region is indicative of smoke or flame. Methods used to make this determination include, but are not limited to, density of the detected region, aspect ratio, and total area.

A partial or full obscuration metric is also based on comparisons between a current image and a reference image. A common method of calculating these metrics requires generating transform coefficients for the reference image and the current image. For example, transform algorithms such as the discrete cosine transform (DCT) or discrete wavelet transform (DWT) may be used to generate the transform coefficients for the reference image and the current image. The coefficients calculated with respect to the current image are compared with the coefficients calculated with respect to the reference image (using any number of statistical methods, such as Skew, Kurtosis, Reference Difference, or Quadratic Fit) to provide an obscuration metric. The obscuration metric indicates whether the current image is either fully or partially obscured, which may in turn indicate the presence of smoke or flame. Likewise, a similar analysis based on calculated coefficients for a reference image and current image can be used to calculate out-of-focus or blurred conditions, which is also indicative of the presence of smoke or flame.

Any one of the above-identified methods (or a combination of several methods) is used to identify areas potentially containing flame or smoke within a particular frame. Following identification of areas potentially containing flame or smoke, the edges of the identified area are defined by edge detector 22.

Edge detector 22 uses the initial identification of areas containing smoke and flame as input in a process that defines the edges or boundary of a region identified as containing smoke or flame. Defining the edges of an identified region allows for the extraction of spatial information related to the identified region, such as perimeter, area, surface area, and volume. In one embodiment, active contours or active surface models are used by edge detector 22 to define the edges of the regions containing smoke or flame. Active contours, or "snakes" as they are sometimes called, are used extensively in computer vision and image processing applications, particularly to locate object boundaries. Active contours are defined as curves that move under the influence of internal forces coming from within the curve itself and external forces computed from the image data. The internal and external forces are defined so that the curve will conform to an object boundary or other desired features within an image. A number of methods exist for defining the external and internal forces to improve boundary detection, each method defining the forces (internal and external) in a unique way to maximize boundary detection. For example, one such method defines the external field using a gradient vector flow (GVF) field. A mathematical description of active contours and shapes, and in particular of the use of gradient vector flow fields is described in the following reference: Xu, Chenyang, and Prince, Jerry L. "Snakes, Shapes, and Gradient Vector Flow." *IEEE Transactions on Image Processing*, Vol. 7, No. 3, March 1998: 359-369.

Thus, the region identified by flame/smoke detector 20 provides a starting place for the active contour model to begin defining edges of the identified region. For example, in one embodiment, the active contour model is initiated outside of the identified region. External forces are defined based on the image domain, and the combination of external and internal forces causes the active contour model to be reduced in size until it fits or defines the edges of the region containing smoke or flame. In another embodiment, the active contour model is initiated within the region identified as containing smoke or flame. Once again, external forces are generated based on the image domain and the combination of external and internal forces causes the active contour to grows in size until it defines the edges of the region containing smoke or flame.

Having defined or outlined the edges (or surface) of the region containing smoke or flame, spatial information associated with the region is extracted by spatial feature extractor 24. In one embodiment, spatial feature extractor 24 determines, based on the defined edges of the identified region, the perimeter and the area of the defined region. In another embodiment, spatial feature extractor 24 determines, based on the defined surface of the identified region, the surface area and volume of the defined region.

In one embodiment, to define the surface area and volume of an identified region, video data from a single video detector may be analyzed over successive frames. Perimeter and area data is calculated with respect to each frame, and combined over a number of successive frames to build a dynamic spatial value associated with an identified region. Surface area and volume can be computed from this dynamic spatial value by integrating the dynamic spatial data (including perimeter and area data). In another embodiment, video data from several video detectors is combined (either using a single frame or number of successive frames). Based on the differing perspectives of each video detector, three-dimensional data such as surface area and volume can be calculated.

The extracted spatial features can be related to one another to determine whether the shape of the identified region is indicative of flame or smoke. In particular, it has been found that flame and smoke, regardless of size, have a characteristic turbulent behavior. By analyzing the shape complexity associated with the defined region, turbulence detector 26 can determine whether the defined region displays the turbulent characteristic of flame and smoke. In a spatial two-dimensional embodiment, shape complexity is determined by relating the perimeter of the identified region to the area of the identified region using the following equation:

$$\Omega_2 = \frac{P}{2\pi^{1/2} * A^{1/2}} \qquad \text{Equation 1}$$

The symbol "$\Omega_2$" represents shape complexity of a two-dimensional region, wherein "P" represents the perimeter of the region, and "A" represents the area of the region. The ratio is normalized such that a circle would result in $\Omega_2$ having a value of unity. As the complexity of a shape increases (i.e., the perimeter increase with respect to the area) the value associated with $\Omega_2$ increases.

In a spatial three-dimensional embodiment, shape complexity is determined by relating the surface area of the identified region to the volume of the identified region using the following equation:

$$\Omega_3 = \frac{SA}{6^{2/3}\pi^{1/3} * V^{1/3}} \qquad \text{Equation 2}$$

Once again, the ratio is normalized such that a sphere would result in $\Omega_3$ having a value of unity. As the complexity of the shape increases the value associated with $\Omega_3$ also increases.

The shape complexity defined with respect to Eq. 1 and Eq. 2 provides insight into the nature of an identified region. The turbulent nature of a region can be detected (regardless of size) by relating the extracted spatial features to one another using a power law relationship. For instance, a power law relationship relating the perimeter to the area (or the equivalent for square root surface area to the cube root of volume) is defined by the following equation:

$$P = c(A^{1/2})^q \qquad \text{Equation 3}$$

The existence of turbulent phenomena is detected by the relation of perimeter P to area A by variable q, wherein c is a constant. In one embodiment, a region is defined as turbulent when q is approximately equal to a value of 1.35. Therefore, turbulence detector 26 relates perimeter to area (or surface area to volume) as shown in Equation 3 to detect whether a given region displays turbulent behavior characteristic of flame and smoke, and remains valid regardless of the size of the region being analyzed. This information is provided to decisional logic 28, which compares the calculated turbulence to learned models to determine whether a particular region contains smoke or flame. In one embodiment, extracted spatial features (and the corresponding calculated turbulences) are stored over time to generate a dynamic view of a particular region. Decisional logic compares the dynamic data to dynamic learned models to determine whether an identified region does indeed contain smoke or flame. Any other decisional logic, such as simple comparison to a threshold, may be employed without departing from the spirit and scope of this invention.

Indication of the presence of smoke or flame is relayed to alarm system 16. In addition, decisional logic 28 may also provide alarm system 16 with information regarding location and size of the fire.

Figure 2:
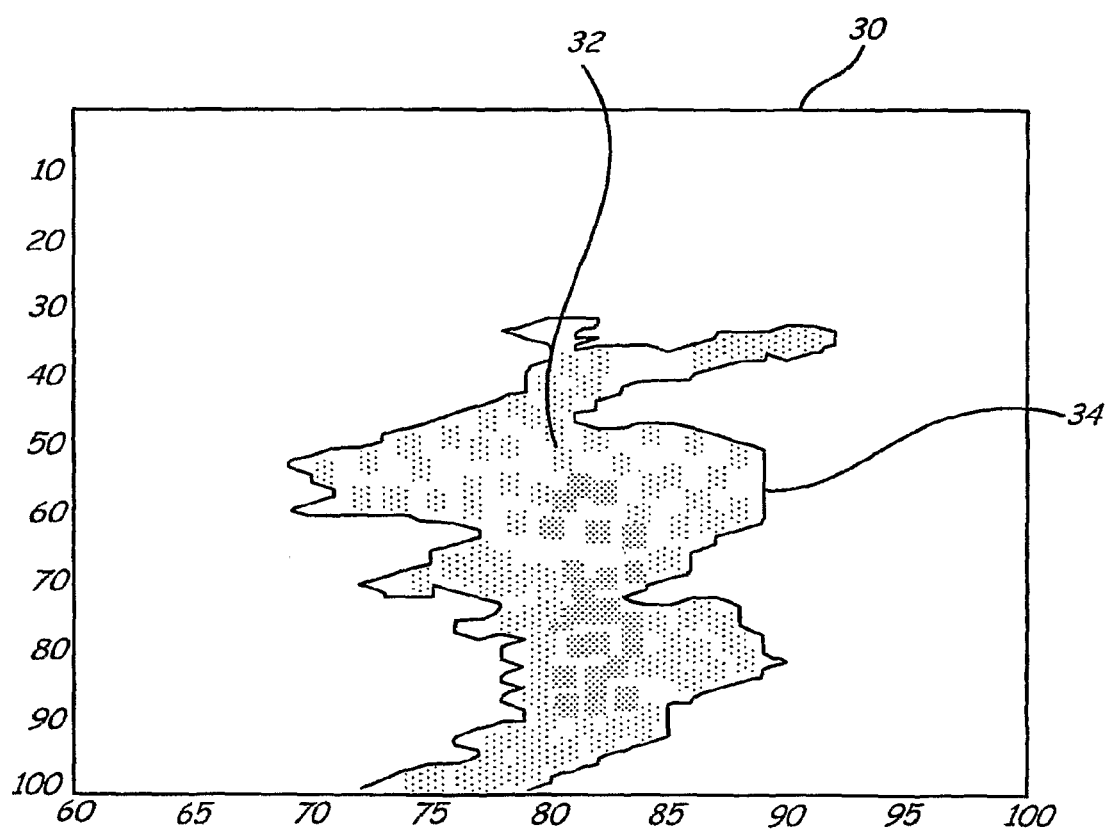
FIG. 2 illustrates analysis of a single frame containing a region identified as potentially containing the presence of smoke or flame.
Figure 3:
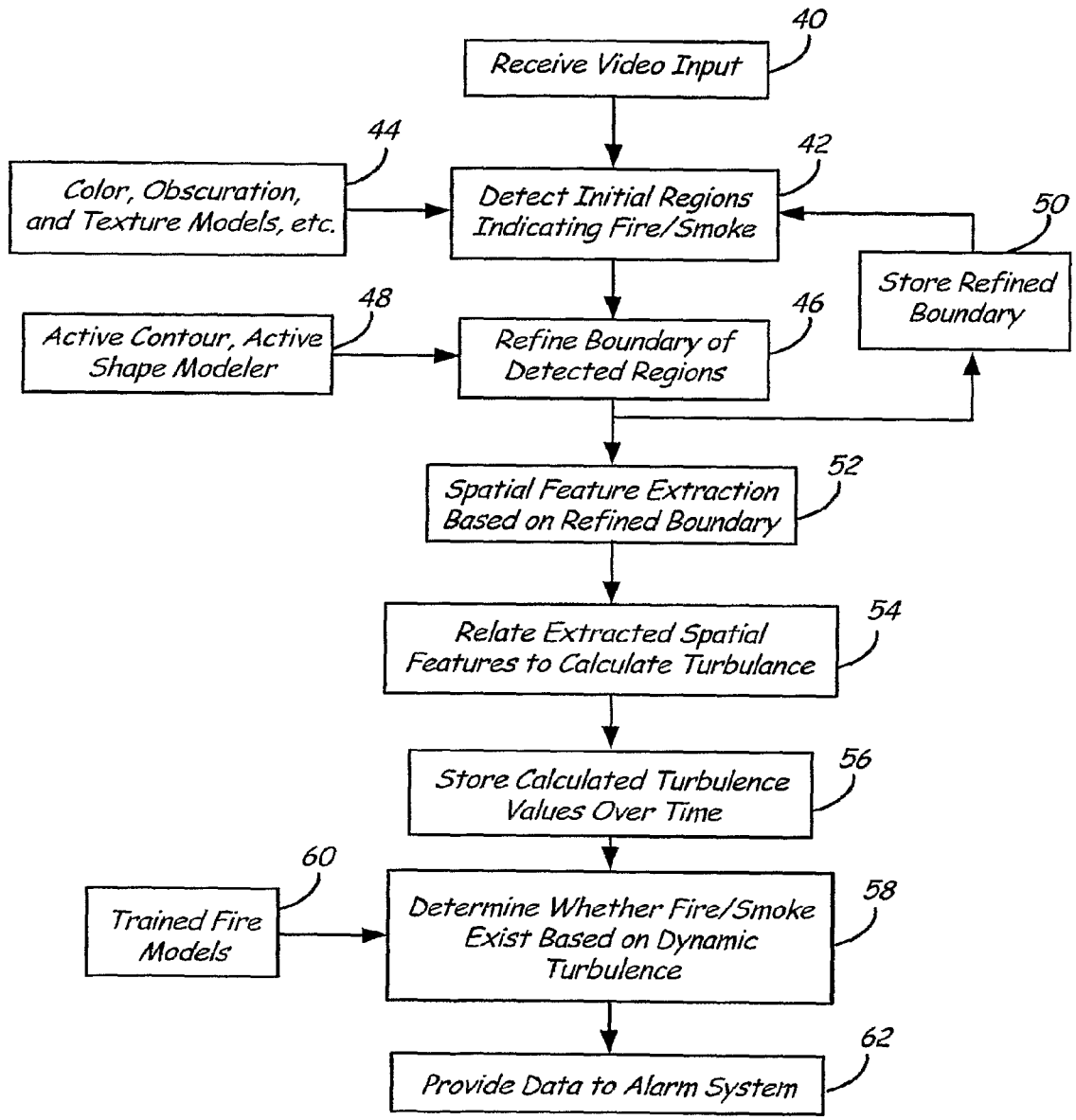
FIG. 3 is a flowchart of a video analysis algorithm for detecting the presence of smoke and flame in a video frame or frames.

FIG. 2 illustrates analysis of frame 30 captured by video detector 12. FIG. 3 is a flow chart illustrating the steps taken by video recognition system 14 (shown in FIG. 1) in analyzing frame 30.

At step 40, frame 30 is received by video recognition system 14. As discussed above, frame buffer 18 may be used to store a single frame or a number of successive frames received from video detector 12. At step 42, initial flame and smoke detection techniques are used to detect regions of frame 30 that indicate the presence of flame or smoke. The tools used to make this initial determination (shown in box 44) may include color analysis, obscuration analysis, texture model analysis, as well as other methods known in the art. Based on this analysis, region 32 within frame 30 is identified as potentially containing flame or smoke.

At step 46, the boundary of region 32 is defined using active contour or active shape model tools (shown in box 48). For instance, in FIG. 2 an active contour model (used for two-dimensional analysis) is used to define boundary 34 outlining region 32. The defined boundary of region 32 is stored at step 50, and provided as input to step 42 to provide shape tracking of the region. The defined boundary can be compared to a successive frame at step 42 to provide additional analysis concerning a particular region. For instance, at step 42 the defined region can be compared with a present frame to determine whether the smoke or flame area has increased in size (indicating a growing fire) or stayed relatively static.

At step 52, spatial features associated with region 32 are extracted based on the refined boundary defined by the active contour/active surface models. For instance, in the two-dimensional spatial embodiment shown in FIG. 2, the perimeter of region 32 is measured and extracted as well as the area of region 32.

At step 54, the spatial features extracted at step 52 are related to one another to determine the shape complexity associated with the region 32. In particular, the extracted spatial features are compared to detect whether region 32 displays turbulent behavior. At step 56, the calculations based on the extracted spatial features are stored to memory. This allows for turbulence of region 32 to be monitored over time, providing a dynamic turbulence measurement. The stored calculations (representing dynamic complexity and turbulence of region 32 over time) are compared to learned models, at step 60, to determine whether region 32 actually contains smoke or flame at step 58. In another embodiment, the instantaneous shape complexity and turbulence may be used alone or in conjunction with dynamic models to determine whether region 32 contains smoke or flame.

If a determination is made that region 32 likely contains smoke or flame, a signal is provided to an alarm system at step 62. In addition to an indication of whether a fire is present, alarm system 16 may also be supplied with data indicating the location of the fire and the size of the fire (based on measurement data taken).

Although FIG. 3 as described above describes the performance of a number of steps, the numerical ordering of the steps does not imply an actual order in which the steps must be performed.

Although the present invention has been described with reference to preferred embodiments, workers skilled in the art will recognize that changes may be made in form and detail without departing from the spirit and scope of the invention. Throughout the specification and claims, the use of the term "a" should not be interpreted to mean "only one", but rather should be interpreted broadly as meaning "one or more." Furthermore, the use of the term "or" should be interpreted as being inclusive unless otherwise stated.

The invention claimed is:

1. A method of detecting smoke or flame using video analysis, the method comprising:
    acquiring video data comprised of individual frames;
    detecting a boundary of region within an individual frame identified as potentially containing smoke or flame;
    measuring spatial values associated with the identified region based on the detected boundary of the region, including measuring a perimeter of the identified region and an area of the identified region; and
    determining whether smoke or flame is present in the identified region based, at least in part, on the measured spatial values associated with the identified region, including relating the perimeter of the identified region and the area of the identified region by the following equation: $P=c(A^{1/2})^q$,
        wherein P is the perimeter of the identified region, A is the area of the identified region, c is a constant, and q is a turbulence value associated with the identified region, wherein determining whether smoke or flame is present in the identified region is based on the calculated turbulence value.

2. The method of claim 1, wherein detecting a boundary of a region within an individual frame includes:
    defining the boundary surrounding the identified region using contour modeling or surface modeling.

3. The method of claim 2, further including:
    analyzing the video input using at least one of the following analytical tools;
        object obscuration analysis, color comparison analysis, flickering effect analysis, blurring analysis, and shape analysis, to identify regions that may contain smoke or flame; and
    initializing the active contour or active surface modeling based on the identified regions that may contain smoke or flame.

4. The method of claim 1, wherein determining whether smoke or flame is present in the identified region includes:
    comparing the measured spatial values to a learned model having threshold values.

5. The method of claim 1, further including:
    calculating a dynamic spatial value by storing results of the detecting and measuring steps performed on successive frames of acquired video data.

6. The method of claim 5, wherein determining whether smoke or flame is present in the identified region includes:
    determining whether smoke or flame is present in the identified region based on the dynamic spatial value.

7. The method of claim 6, where determining whether smoke or flame is present in the identified region based on the dynamic spatial value includes:
    comparing the generated dynamic spatial value to a learned model that indicates the presence of flame or smoke.

8. The method of claim 5, further including:
    calculating a surface area and a volume associated with the identified region based on the dynamic spatial value calculated with respect to the identified region.

9. The method of claim 8, wherein determining whether smoke or flame is present in the identified region includes:
    relating the surface area of the region and the volume of the region by the following equation: $SA=c(V^{2/3})^q$, wherein SA is the surface area of the identified region, v is the volume of the identified region, c is a constant, and q is a turbulence value associated with the identified region, wherein determining whether smoke or flame is present in the identified region is based on the calculated turbulence value.

10. A video recognition system for detecting the presence of flame or smoke, the video recognition system comprising:
- means for acquiring video data;
- means for detecting a boundary of a region within an individual frame that may contain smoke or flame;
- means for measuring spatial values associated with the region based on the detected boundary of the region, including means for measuring a perimeter of the region and an area of the region; and
- means for determining whether smoke or flame is present in the region based at least in part on the measured spatial values associated with the region, including means for relating the perimeter of the region and the area of the region by the following equation: $P=c(A^{1/2})^q$, wherein P is the perimeter of the region, A is the area of the region, c is a constant, and q is a turbulence value that is calculated based on the measured perimeter and measured area of each of the regions, wherein determining whether smoke or flame is present in the region is based on the calculated turbulence value q.

11. The system of claim 10, wherein the means for detecting a boundary of a region within an individual frame includes:
- means for defining the boundary surrounding the region using contour modeling or surface modeling.

12. The system of claim 11, further including:
- means for analyzing the video input to identify a region that may contain smoke or flame using at least one of the following analytical tools: object obscuration analysis, color comparison analysis, flickering effect analysis, blurring analysis, and shape analysis; and
- means for initializing the active contour or active surface modeling based on identified regions that may contain smoke or flame.

13. The system of claim 10, wherein the means for measuring spatial values associated with the region based on the detected boundary of the region includes:
- means for measuring a surface area of the region and a volume of the region.

14. The system of claim 13, wherein the means for determining whether smoke or flame is present in the region includes:
- means for relating the surface area of the region and the volume of the region by the following equation: $SA=c(V^{2/3})^q$, wherein SA is the surface area of the region, V is the volume of the region, c is a constant, and q is a turbulence value that is calculated based on the measured perimeter and measured area of each of the detected regions, wherein determining whether smoke or flame is present in the region is based on the calculated turbulence value q.

15. The system of claim 10, wherein the means for determining whether smoke or flame is present in the region includes:
- means for comparing the measured spatial values to a learned model having threshold values.

16. The system of claim 10, further including:
- means for storing the measured spatial values associated with the region in successive frames to generate a dynamic spatial value; and
- means for determining whether the region contains smoke or flame by comparing the dynamic spatial value to a dynamic learned model.

17. A system for detecting the presence of flame or smoke, the system comprising:
- at least one video detector for capturing video input; and
- a video recognition system that receives video input from the at least one video detector, defines boundaries around regions that may contain smoke or flame, measures spatial values associated with each region based on the defined boundaries, and determines whether flame or smoke is present based on the measured spatial values, including by relating the perimeter of a region and the area of the region by the following equation: $P=c(A^{1/2})^q$, wherein P is the perimeter of the region, A is the area of the region, c is a constant, and q is a turbulence value associated with the region, wherein determining whether smoke or flame is present in the region is based on the calculated turbulence value.

18. The system of claim 17, wherein the video recognition system extracts perimeter and area data with respect to the region that may contain smoke or flame based on the defined boundary, and relates the extracted perimeter to the extracted area to determine if the region contains smoke or flame.

19. The system of claim 17, wherein the video recognition system extracts surface area and volume data with respect to the region that may contain smoke or flame based on the defined boundary, and relates the extracted surface area to the extracted volume to determine whether the detected region contains flame or smoke.

* * * * *